United States Patent [19]
Wright et al.

[11] Patent Number: 5,375,419
[45] Date of Patent: Dec. 27, 1994

[54] INTEGRATED HYDRAULIC SYSTEM FOR ELECTROHYDRAULIC VALVETRAIN AND HYDRAULICALLY ASSISTED TURBOCHARGER

[75] Inventors: Gordon Wright, Plymouth; Michael M. Schechter, Farmington Hills; Michael B. Levin, Birmingham, all of Mich.

[73] Assignee: Ford Motor Company, Dearborn, Mich.

[21] Appl. No.: 167,302

[22] Filed: Dec. 16, 1993

[51] Int. Cl.⁵ .............................................. F02B 33/44
[52] U.S. Cl. ................................... 60/607; 123/90.12
[58] Field of Search .................. 123/565, 90.12, 90.13; 60/607, 608

[56] References Cited

U.S. PATENT DOCUMENTS

| | | | |
|---|---|---|---|
| 2,968,914 | 1/1961 | Birman | 60/608 |
| 4,188,925 | 2/1980 | Jordan | 123/90.12 |
| 4,285,200 | 8/1981 | Byrne et al. | 60/607 |
| 4,322,949 | 4/1982 | Byrne et al. | 60/607 |
| 5,255,641 | 10/1993 | Schechter | 123/90.12 |

OTHER PUBLICATIONS

1983 Society of Automotive Engineers (Jul.) pp. 49–52.

*Primary Examiner*—Richard A. Bertsch
*Assistant Examiner*—Charles G. Freay
*Attorney, Agent, or Firm*—Donald A. Wilkinson; Roger L. May

[57] ABSTRACT

An integrated hydraulic system for controlling an engine valve control system wherein each of the reciprocating intake and/or exhaust valves is hydraulically controlled and selectively connected to a source of high pressure fluid and a source of low pressure fluid, and a hydraulically assisted turbocharger selectively connected to a high pressure source of fluid by a solenoid valve, with the turbocharger including a nozzle jet and an impulse type turbine.

4 Claims, 1 Drawing Sheet

INTEGRATED HYDRAULIC SYSTEM FOR ELECTROHYDRAULIC VALVETRAIN AND HYDRAULICALLY ASSISTED TURBOCHARGER

FIELD OF THE INVENTION

The present invention relates to hydraulic systems in motor vehicle engines, and more particularly to systems for hydraulically controlling internal combustion engine intake and exhaust valves and turbochargers.

BACKGROUND OF THE INVENTION

The increased use and reliance on microprocessor control systems for automotive vehicles and increased confidence in hydraulic as opposed to mechanical systems is making substantial progress in engine systems design possible. Electrohydraulic systems in vehicles provide more flexibility to increase engine performance, with a drawback that now more systems will need a source of pressurized hydraulic fluid to operate. These separate systems can take up much room and add weight as well as creating parasitic losses. This is especially true for those systems which only occasionally require pressurized hydraulic fluid.

One such electrohydraulic system is a control for engine intake and exhaust valves. The enhancement of engine performance to be attained by being able to vary the acceleration, velocity and travel time of the intake and exhaust valve in an engine is well known and appreciated in the art. This allows one to account for various engine operating conditions through independent control of each valve to optimize engine performance. This type of system typically requires a constant supply of pressurized hydraulic fluid to operate.

Another type of electrohydraulic system provides hydraulic assist to a turbocharger to improve the response time of the turbocharger under certain engine operating conditions. At low engine operating speeds and during increasing load conditions, the effectiveness of a turbocharger as a means to quickly boost the engine air supply is rather low. Only after some initial increase in engine speed and power has already been achieved, does the turbocharger become an effective means for further increase in engine power. Adding a hydraulic turbine wheel to the turbocharger can substantially alleviate this problem. Such a turbine, which can be selectively activated by supplying it with pressurized oil for brief periods during which the energy supplied by the exhaust gas is too low, can significantly improve the response of the engine/turbocharger system. The problem with adding a hydraulic turbine to a turbocharger is that it also requires installation of a high pressure hydraulic system, which adds additional cost and complexity to the vehicle. This is especially true because this hydraulic system would only be needed occasionally.

In an engine where a hydraulic system already exists, such as one having an electrohydraulic valvetrain, modifying the hydraulic system to perform as a dual purpose system providing boost to the turbocharger can save cost, space and weight as well as reducing the parasitic losses.

SUMMARY OF THE INVENTION

In its embodiments, the present invention contemplates, in combination, a hydraulically controlled valvetrain, a hydraulically assisted turbocharger and a hydraulic control system. The hydraulic control system includes a low pressure supply of fluid, a hydraulic pump cooperating with the low pressure supply, and a pressure regulating device coupled to the hydraulic pump. The hydraulic control system further includes a high pressure line connected to the hydraulically controlled valvetrain and the hydraulically assisted turbocharger, and a means for selectively restricting flow in the high pressure line between the hydraulic pump and the hydraulically assisted turbocharger.

Accordingly, an object of the present invention is to provide an integrated hydraulic system capable of controlling both an electrohydraulic valvetrain and a hydraulically assisted turbocharger.

An advantage of the present invention is the cost and weight reduction accomplished by having an integrated hydraulic power system for an electrohydraulic valvetrain and a hydraulically assisted turbocharger.

The present invention eliminates parasitic losses associated with two separate hydraulic systems rather than a single integrated hydraulic system.

DETAILED DESCRIPTION OF THE PREFERRED EMBODIMENTS

Figure 1:
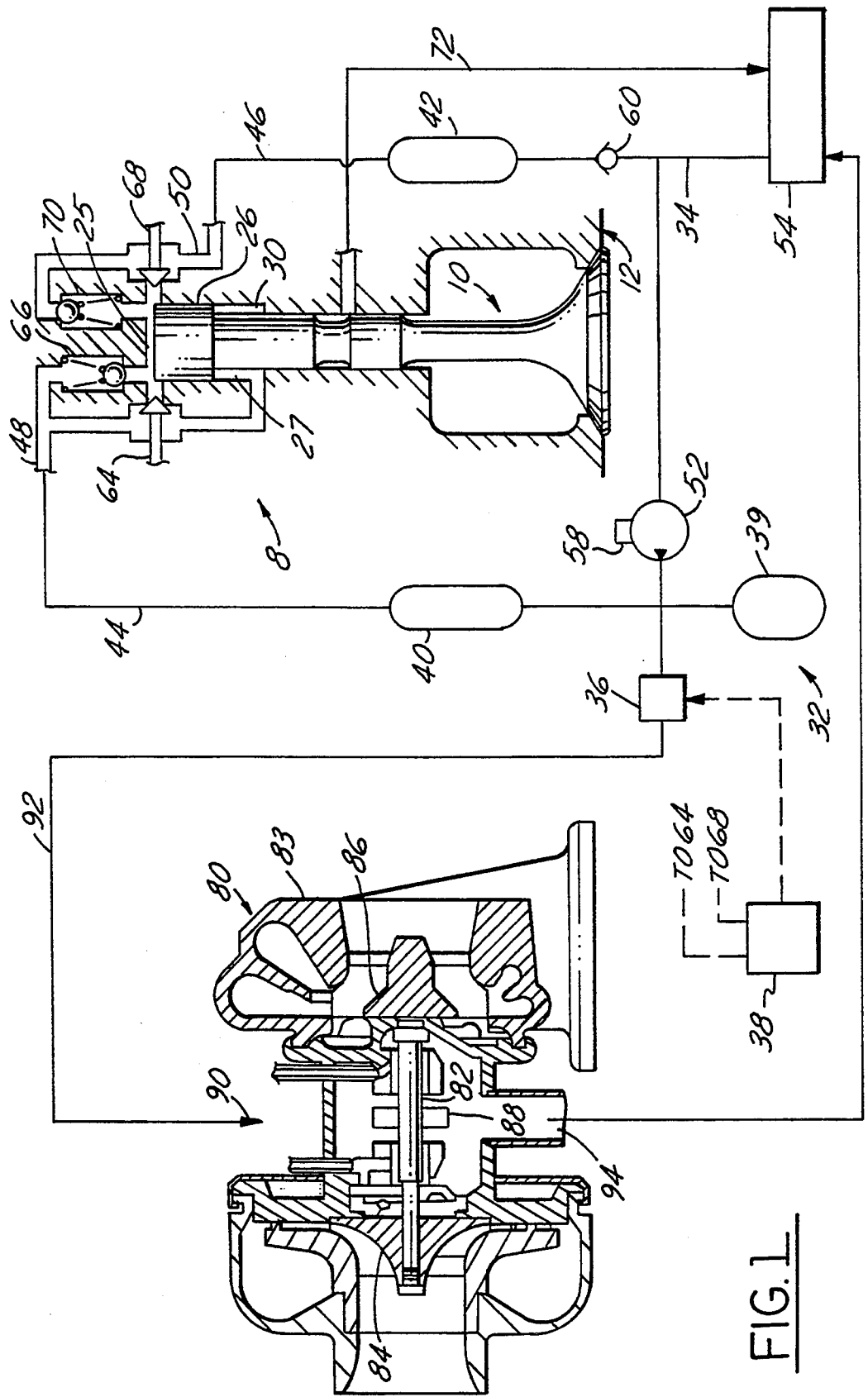
FIG. 1 is a schematic view of an integrated hydraulic system connected to electrohydraulically controlled valve assembly and hydraulic assisted turbocharger in accordance with the present invention.

FIG. 1 shows an integrated hydraulic system connected to an electrohydraulic engine valve assembly 8 and a hydraulically assisted turbocharger 80. While this figure shows one possible embodiment for the valvetrain and turbocharger, other hydraulic valvetrains and turbochargers can also have similarly integrated hydraulic systems to provide improvements in cost, weight and parasitic losses. An electrohydraulic valvetrain is shown in detail in U.S. Pat. No. 5,255,641 to Schechter, which is incorporated herein by reference.

A single engine valve assembly 8 of an electrohydraulically controlled valvetrain is shown in FIG. 1. An engine valve 10, for inlet air or exhaust as the case may be, is located within a cylinder head 12. A valve piston 26, fixed to the top of the engine valve 10, is slidable within the limits of piston chamber 30.

Fluid is selectively supplied to the volume 25 above the piston 26 from a high pressure oil reservoir 40 and a low pressure oil reservoir 42 hydraulically connected through a high pressure line 44 and a low pressure line 46, respectively, to a high pressure port 48 and a low pressure port 50, respectively.

The volume 25 is connected to the high pressure oil reservoir 40 through a solenoid valve 64 or a check valve 66, or to the low pressure oil reservoir 42 through solenoid valve 68 or a check valve 70. The volume 27 below the piston 26 is always connected to the high pressure oil reservoir 40. Fluid return line 72 provides a means for returning to a sump or low pressure oil supply 54 any fluid which leaks out of the piston chamber 30.

The engine valve opening is controlled by the high-pressure solenoid valve 64 which opens, causing valve acceleration, and closes, causing deceleration. Opening and closing of the low pressure solenoid valve 68 controls the engine valve closing.

During engine valve opening, the high pressure solenoid valve 64 opens and the net pressure force acting on the piston 26 accelerates the engine valve 10 downward. When the high pressure solenoid valve 64 closes, pressure above the piston 26 drops, and the piston decelerates pushing the fluid from the volume 27 below it back into the high pressure oil reservoir 40. Low pressure fluid flowing through the low pressure check valve 70 prevents void formation in the volume above the piston 26 during deceleration. When the downward motion of the engine valve 10 stops, the low pressure check valve 70 closes and the engine valve 10 remains locked in its open position.

The process of valve closing is similar, in principle, to that of valve opening. The low pressure solenoid valve 68 opens, the pressure above the piston 26 drops and the net pressure force acting on the piston 26 accelerates the engine valve 10 upward. When the low pressure solenoid valve 68 closes, pressure above the piston 26 rises, and the piston 26 decelerates pushing the fluid from the volume 25 above it through the high-pressure check valve 66 back into the high-pressure oil reservoir 40.

FIG. 1 also shows a hydraulically assisted turbocharger 80 connected to the integrated hydraulic system 32. The turbocharger includes a turbocharger shaft 82, mounted in a housing 83, having a compressor wheel 84 coupled to one end and a turbine wheel 86 coupled to the other. Coupled to a center portion of the shaft 82 is an impulse type turbine 88, such as a Pelton Wheel. A nozzle jet 90 is located in close proximity to the impulse turbine 88 and connected to a high pressure source of fluid via a high pressure line 92. On the other side of the turbine 88 is an outlet 94 leading to the sump 54. Energy is transferred to the turbocharger shaft via the nozzle 90 jetting high pressure oil against blades of the turbine 88. This helps to overcome the inertia of the turbocharger 80, and supplements exhaust energy input to the turbocharger at low engine operating speeds and during increasing load conditions at any speed.

The high pressure oil needed for both of the above described systems is supplied by the integrated hydraulic system 32. FIG. 1 shows a variable displacement hydraulic pump 52 connected to the reservoir or sump 54 by low pressure line 34. The hydraulic pump 52 is equipped with a pump controller or a pressure regulating device 58. The pressure regulator 58 maintains the required pressure in the high pressure system, regardless of changes in oil consumption, by varying the oil delivery. Fluid in the low pressure oil reservoir 42 of the valve assembly 8 is maintained at a fixed low pressure by means of discharge valve or check valve 60, connected to the sump 54 via low pressure line 34.

The pump 52 continuously supplies oil to the high pressure oil reservoir 40 of the hydraulic valvetrain 8. Since the fluid in the high pressure oil reservoir 40 in the valve assembly 8 is subject only to expansion and contraction, the pumping work of the pump 52 is largely limited to that necessary to compensate for internal leakage through clearances. Pump 52 is also connected to high pressure line 92, to supply high pressure oil to the hydraulic turbine wheel 88 in the turbocharger 80. Along high pressure line 92, between the pump 52 and nozzle jet 90, is a solenoid valve 36.

The solenoid valve 36 is normally closed but opens whenever it receives an electronic activation signal from an engine control system 38. The control system 38 continuously monitors the operation of the engine. Whenever there is instantaneous demand for high engine torque, but the torque supplied by turbine 86 within turbocharger 80 will be too low for quick power boost, engine control system 38 sends a signal and solenoid 36 is opened, causing a flow of high pressure oil to be supplied to turbine 86, which quickly accelerates the turbocharger 80, thus providing a power boost to the engine. As soon as the engine speed and power reaches the level at which the turbine develops adequate torque, the solenoid valve 36 is closed and the supply of hydraulic power to the turbocharger 80 is terminated. Hydraulic system 32 also preferably includes a hydraulic accumulator 39, which helps to reduce any transient pressure fluctuations that may occur during activation and deactivation of the solenoid valve 36.

While certain embodiments of the present invention have been described in detail, those familiar with the art to which this invention relates will recognize various alternative designs and embodiments for practicing the invention as defined by the following claims.

We claim:

1. An integrated hydraulic system for controlling electrohydraulically actuated engine valves and a hydraulically assisted turbocharger having a pelton wheel, the hydraulic system comprising:
   a hydraulic pump connected to a fluid reservoir for pressurizing hydraulic fluid;
   a first high pressure line connected between the electrohydraulically actuated engine valves and the hydraulic pump
   a nozzle jet, located in proximity to the pelton wheel;
   a second high pressure line, connected between the nozzle jet and the hydraulic pump;
   a pressure regulating device coupled to the hydraulic pump for maintaining pressure in the first and the second high pressure lines;
   valve means for selectively restricting flow in the second high pressure line between the hydraulic pump and the hydraulically assisted turbocharger; and
   a hydraulic accumulator connected to the first and the second high pressure lines for reducing any transient pressure fluctuations that may occur during activation of the valve means.

2. An integrated hydraulic system according to claim 1 wherein the hydraulic control system further comprises a high pressure reservoir connected along the first high pressure line between the hydraulic pump and the electrohydraulically actuated engine valves.

3. An integrated hydraulic system according to claim 1 wherein the valve means comprises a solenoid valve connected along the second high pressure line and an engine control system electrically connected to the solenoid valve for controlling the opening and closing of the solenoid valve.

4. An integrated hydraulic system according to claim 1 further including a first fluid return connected between the engine valves and the fluid reservoir and a second fluid return connected between the hydraulically assisted turbocharger and the fluid reservoir.

* * * * *